US008002467B2

(12) United States Patent
Wright et al.

(10) Patent No.: US 8,002,467 B2
(45) Date of Patent: *Aug. 23, 2011

(54) RECLOSABLE FASTENER PROFILE SEAL AND METHOD OF FORMING A FASTENER PROFILE ASSEMBLY

(75) Inventors: Donald K. Wright, Murphysboro, IL (US); Christopher L. Pemberton, Marion, IL (US); James K. Hankins, Harrisburg, IL (US)

(73) Assignee: Com-Pac International, Inc., Carbondale, IL (US)

( * ) Notice: Subject to any disclaimer, the term of this patent is extended or adjusted under 35 U.S.C. 154(b) by 768 days.

This patent is subject to a terminal disclaimer.

(21) Appl. No.: 10/831,989

(22) Filed: Apr. 26, 2004

(65) Prior Publication Data

US 2004/0204303 A1 Oct. 14, 2004

Related U.S. Application Data

(63) Continuation-in-part of application No. 09/415,696, filed on Oct. 12, 1999, now abandoned, and a continuation-in-part of application No. 10/337,139, filed on Jan. 7, 2003, now Pat. No. 7,041,249.

(51) Int. Cl.
*B65D 33/16* (2006.01)
*A44B 19/00* (2006.01)
(52) U.S. Cl. ...................................... 383/63; 24/585.12
(58) Field of Classification Search .................... 383/63; 24/585.12
See application file for complete search history.

(56) References Cited

U.S. PATENT DOCUMENTS

| | | | |
|---|---|---|---|
| 3,410,745 A | 11/1968 | Canepa | |
| 3,723,225 A | 3/1973 | Canepa | |
| 3,932,257 A | 1/1976 | Noguchi | |
| 3,948,705 A | 4/1976 | Ausnit | |
| 3,986,914 A | 10/1976 | Howard | |
| 3,999,255 A | 12/1976 | Warburton et al. | |
| 4,094,729 A | 6/1978 | Boccia | |
| 4,352,654 A | 10/1982 | Heimberger | |
| 4,555,282 A | 11/1985 | Yano | |
| 4,787,755 A | 11/1988 | Branson | |
| 4,827,163 A | 5/1989 | Kettner | |
| 4,892,512 A | 1/1990 | Branson | |

(Continued)

FOREIGN PATENT DOCUMENTS

EP 0215761 A1 3/1987

(Continued)

OTHER PUBLICATIONS

Translation of Japanese Document No. 4-201861. Translated in Dec. 2009 by The McElroy Translation Company.*

(Continued)

*Primary Examiner* — Jes F Pascua
(74) *Attorney, Agent, or Firm* — Vedder Price PC

(57) ABSTRACT

A fastener profile assembly and method of forming a fastener profile assembly is provided. The assembly includes a continuous supply of two interlocking profiles which are sealed at either end with a compression molded segment seal. The compression molded segment seal is formed through the application of heat and pressure to the interlocking profiles, thereby fusing the area and forming one end of the profile. Advancement of the profiles and application of heat and pressure to a second area forms the second end of the profile assembly. Manufacture of a fastener in such a manner allows for highly automated profile production with precise, accurate registration of the fastener profile.

8 Claims, 7 Drawing Sheets

U.S. PATENT DOCUMENTS

| | | | |
|---|---|---|---|
| 4,909,870 A | | 3/1990 | Gould et al. |
| 4,961,805 A | | 10/1990 | Siebert |
| 5,035,517 A | * | 7/1991 | Edelman ........................ 383/204 |
| 5,071,689 A | * | 12/1991 | Tilman .......................... 428/121 |
| 5,088,971 A | | 2/1992 | Herrington |
| 5,091,036 A | | 2/1992 | Taylor |
| 5,335,997 A | | 8/1994 | Kanemitsu et al. |
| 5,405,561 A | | 4/1995 | Dais et al. |
| 6,033,113 A | * | 3/2000 | Anderson ........................ 383/63 |
| 6,059,457 A | * | 5/2000 | Sprehe et al. ................... 383/63 |
| 6,063,224 A | | 5/2000 | Tomic et al. |
| 6,216,423 B1 | | 4/2001 | Thieman |
| 6,357,914 B1 | | 3/2002 | Kinigakis et al. |
| 6,499,272 B2 | | 12/2002 | Thieman |
| 6,562,165 B1 | | 5/2003 | Bauman et al. |
| 2002/0017078 A1 | | 2/2002 | Thieman |
| 2002/0023321 A1 | | 2/2002 | Clune |
| 2002/0037115 A1 | | 3/2002 | Kinigakis et al. |
| 2002/0152719 A1 | | 10/2002 | Kinigakis et al. |
| 2002/0152720 A1 | | 10/2002 | Kinigakis et al. |
| 2002/0152721 A1 | | 10/2002 | Kinigakis et al. |
| 2002/0154836 A1 | | 10/2002 | Kinigakis et al. |
| 2002/0178693 A1 | | 12/2002 | Kinigakis et al. |
| 2003/0050167 A1 | | 3/2003 | Kinigakis et al. |
| 2003/0074861 A1 | | 4/2003 | Thieman |

FOREIGN PATENT DOCUMENTS

| | | | |
|---|---|---|---|
| EP | 0446760 A1 | | 9/1991 |
| EP | 0510797 A1 | | 10/1992 |
| EP | 0528721 A1 | | 2/1993 |
| EP | 0647415 A1 | | 4/1995 |
| EP | 0792802 A1 | | 9/1997 |
| FR | 1529850 A | | 6/1968 |
| FR | 1564039 | | 4/1969 |
| JP | 04201861 A | * | 7/1992 |

OTHER PUBLICATIONS

"Matrix" Merriam-Webster Online Dictionary. 2005. http://merriam-webster.com (May 23, 2005).

"Die" Merriam-Webster Online Dictionary. 2005. http://merriam-webster.com (May 23, 2005).

* cited by examiner

RECLOSABLE FASTENER PROFILE SEAL AND METHOD OF FORMING A FASTENER PROFILE ASSEMBLY

This is a continuation-in-part of patent application Ser. No. 09/415,696, which was filed on Oct. 12, 1999, now abandoned, and a continuation-in-part of patent application Ser. No. 10/337,139, which as filed on Jan. 7, 2003, now U.S. Pat. No. 7,041,249, and which is incorporated herewith by reference.

BACKGROUND OF THE INVENTION

The invention relates generally to reclosable fasteners and a method of forming a reclosable fastener profile assembly which allows for fast, automated production and accurate, seal registration. In particular, the invention relates to a seal arrangement for a reclosable zipper profile strip, which is created through the application of heat and pressure to a male and female profile to form a 'compression molded segment' seal, and to a method of producing such a seal.

The popularity of reclosable zipper fasteners has created a demand for a large number and wide variety of reclosable bag sizes and types. It is commonly known in the art to form a reclosable bag through the addition of a zipper profile to a pair of bag walls in order to form a bag with a reclosable, airtight seal. However, improper registration may cause the seal to weaken and fail over time or become permeable to the air. In many reclosable bag applications, an airtight seal is necessary to maintain the freshness of articles placed in the bag. Further, such seals must be suitable for high-speed automated production in order to make the production of reclosable bags commercially viable.

In the case of zipper profiles, commonly known methods of construction and seal formation often cause inaccurate, commercially unacceptable seals which cannot be produced on an economically practical scale. Commonly known profile formation methods in the art require multiple sealing devices, precise machinery or extensive retooling to alter the size and type of reclosable fastener. Exemplary devices are shown and described in U.S. Pat. Nos. 5,601,368 (Bodolay); 3,847,711 (Howard); 5,461,845 (Yeager); 5,823,933 (Yeager); 4,241,865 (Ferrell); 4,335,817 (Bahr); 4,909,017 (McMahon); and 5,024,537 (Tilman). As such, none of the devices referenced above satisfy the need for a multi-purpose reclosable zipper profile, which can be accurately and economically manufactured.

Therefore, an unfulfilled need remains for a zipper profile which can be accurately manufactured at a high rate of speed and which can be adapted to a wide range of reclosable zipper bag applications.

SUMMARY OF THE INVENTION

The present invention provides a reclosable fastener profile seal and a disclosed method of forming a fastener profile assembly. In particular, the preferred embodiment of the method of forming a fastener assembly includes a first profile strip, a second profile strip and a compression molded segment seal fusing the first and second profiles together to provide a reclosable faster having fused ends which form the opening for a reclosable bag. To manufacture the assembly, the first profile strip and second profile strip are fed by at least one motorized roller from a web or roll of respective profile strips. Interlocking ribs are included on the profiles to create an airtight reclosable seal which is suitable for a wide range of applications.

Those of ordinary skill in the art might construe the term "air tight" differently. Webster's Collegiate Dictionary, Tenth Edition, copyright 1997 by Merriam-Webster, Inc., defines "air tight" to mean "impermeable to air, or nearly so." Under such as definition for "air tight," those of ordinary skill in the art might construe an "air tight" seal on a plastic bag to mean a seal that is actually impermeable, or only nearly impermeable to air. Alternatively, persons of ordinary skill might construe an "air tight" reclosable seal to be defined by an industry standard air leak test known as ASTM D3078-02. Under this standard, a bag is submersed in water above which a pressure is applied. Leaks in the bags seal are manifested as air bubbles. As used herein, an "air tight" seal means a seal that will prohibit the transfer or movement of air molecules at atmospheric pressure and room temperature, across or through the seal structure for a substantially long time. In other words, an airtight seal should prohibit the transfer of air molecules from the inside to the outside and vice versa. For example, an "air tight" seal should be able to keep air molecules in a bag prior to the seal's closure and air molecules outside the bag after the seal's closure, for as long as the product contained within the bag is expected to be kept reasonably fresh.

The first and second profile strips are engaged to form a reclosable profile assembly. After the first and second profiles are interconnected, a portion of the first and second profile are sealed together. The interconnected first profile and second profiles are advanced and staggered applications of a compression molded segment seal are applied to the end portions of each profile assembly. This allows the profile assembly to be formed at a high rate with good accuracy. While being fused, the first and second profiles are cut to provide for individual reclosable fasteners.

In an alternative embodiment, the individual reclosable fastener profiles are not cut, thereby providing a continuous linear strip of fully formed reclosable bag profiles. In such an embodiment, the completed reclosable fasteners may be wound onto a roll for later separation and addition to bag walls.

It is a principal advantage of the invention to provide a reclosable fastener profile seal and method of forming a fastener profile assembly that can be produced quickly and precisely to form a zipper profile suitable for use in a wide range of reclosable bag applications.

It is another advantage of the invention to provide a reclosable profile assembly and a method of forming a reclosable fastener profile assembly, which is easily adjustable to provide a reclosable fastener profile of any commercially desirous length.

It is another advantage of the present invention to provide a reclosable profile assembly and a method of forming a reclosable fastener profile assembly, which is readily adaptable to seal and form reclosable fasteners and profiles of various sizes and styles.

It is yet another advantage of the invention to provide a reclosable profile assembly, which is suitable for attachment to a wide range of bag wall sizes and types.

Various other features and advantages of the invention are set forth in the following detailed description, drawings and claims.

Figure 1:
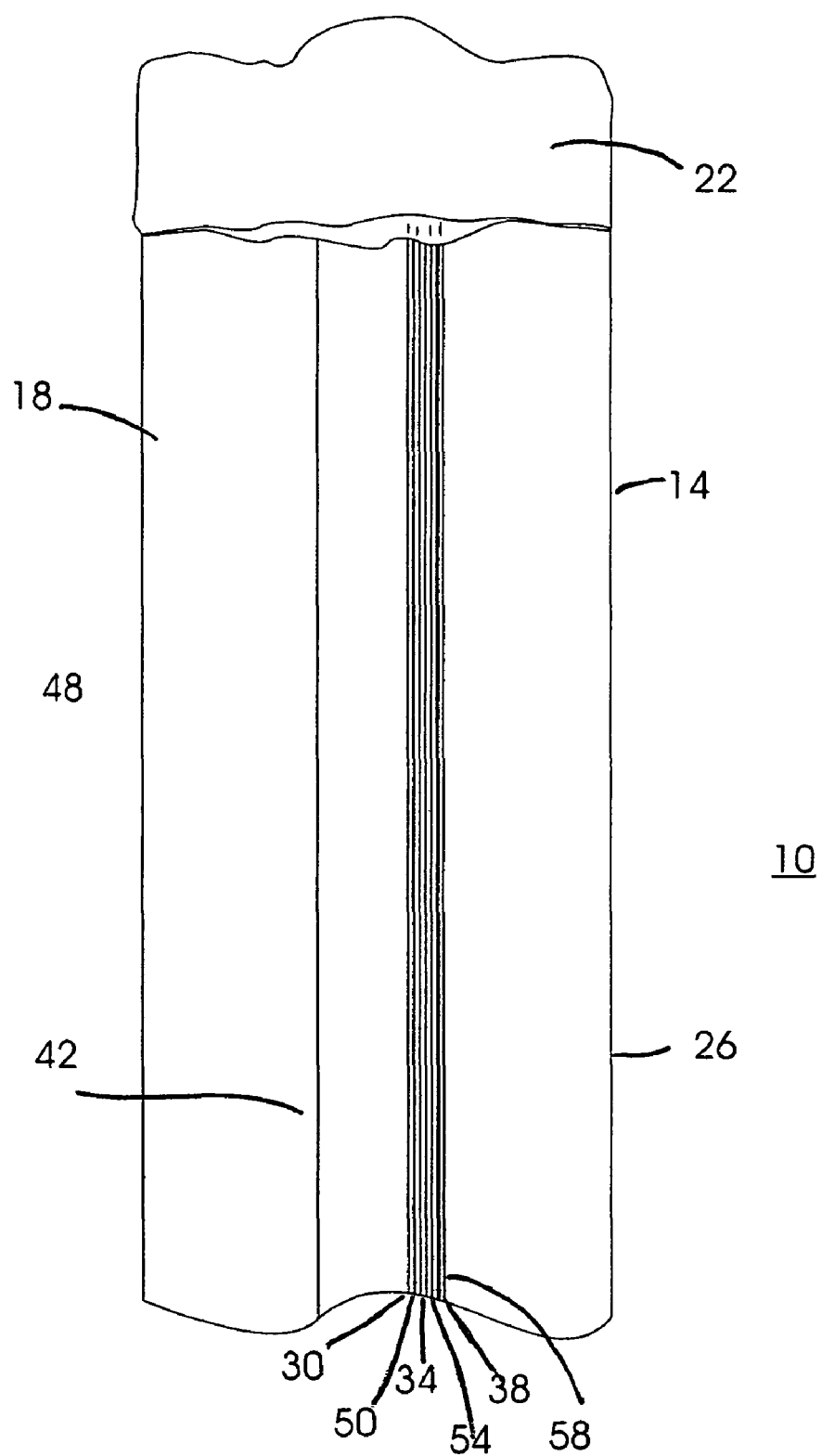
FIG. 1 is a front elevational view of a portion of the profile assembly embodying the invention including the compression molded segment seal.

While the specification and claims herein may refer to specific fastener or rib structures, it will be understood and fully appreciated that the principles of the present invention refer to closures generally and incorporate any compatible closure type or style. As such, before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

As seen in FIGS. 1 through 4, the reclosable profile 10 assembly as disclosed in the present embodiment includes a first profile 14, a second profile 18 and a compression molded segment seal 22. The profile assembly 10 has a length, which may be reduced or enlarged in accordance with the present application to accommodate any length required by a particular industry application.

The profile assembly 10 includes a first profile 14. The first profile 14 is flat, thin piece of packaging material preferably manufactured from polyethylene. As most clearly depicted in FIGS. 1, 2, 3 and 4, the first profile 14 includes a first profile surface 26 including an end 28, a first rib 30, second rib 34 and third rib 38. The first rib 30, second rib 34 and third rib 38 are in a location offset from the center of the first profile 14, thereby defining a profile adherence surface 42 between ribs 30, 34, 38 and the edge 44 of the first profile strip 14. As seen in FIGS. 1 through 4, the first rib 30, second rib 34 and third rib 38 of the first profile 14 extend the entire length of the first profile surface 26.

Figure 4:
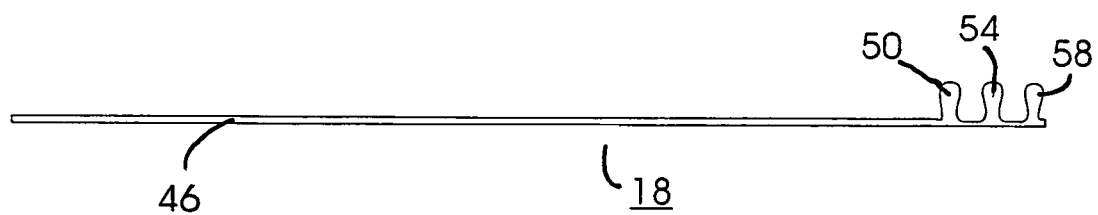
FIG. 4 is a side elevational view of the second profile of FIGS. 1 and 2.

The second profile 18 is preferably manufactured from the same material and with the same dimensions as the first profile 14. As best depicted in FIG. 2, the second profile 18 includes a second profile surface 46 including an end 48, first rib 50, second rib 54 and third rib 58. As best depicted in FIG. 4, the first rib 30, second rib 34 and third rib 38 are located along one edge 40 of the second profile 18. As seen in FIGS. 1 through 4, the first rib 30, second rib 34 and third rib 38 of the second profile 18 extend the entire length of the second profile surface 46.

Figure 2:
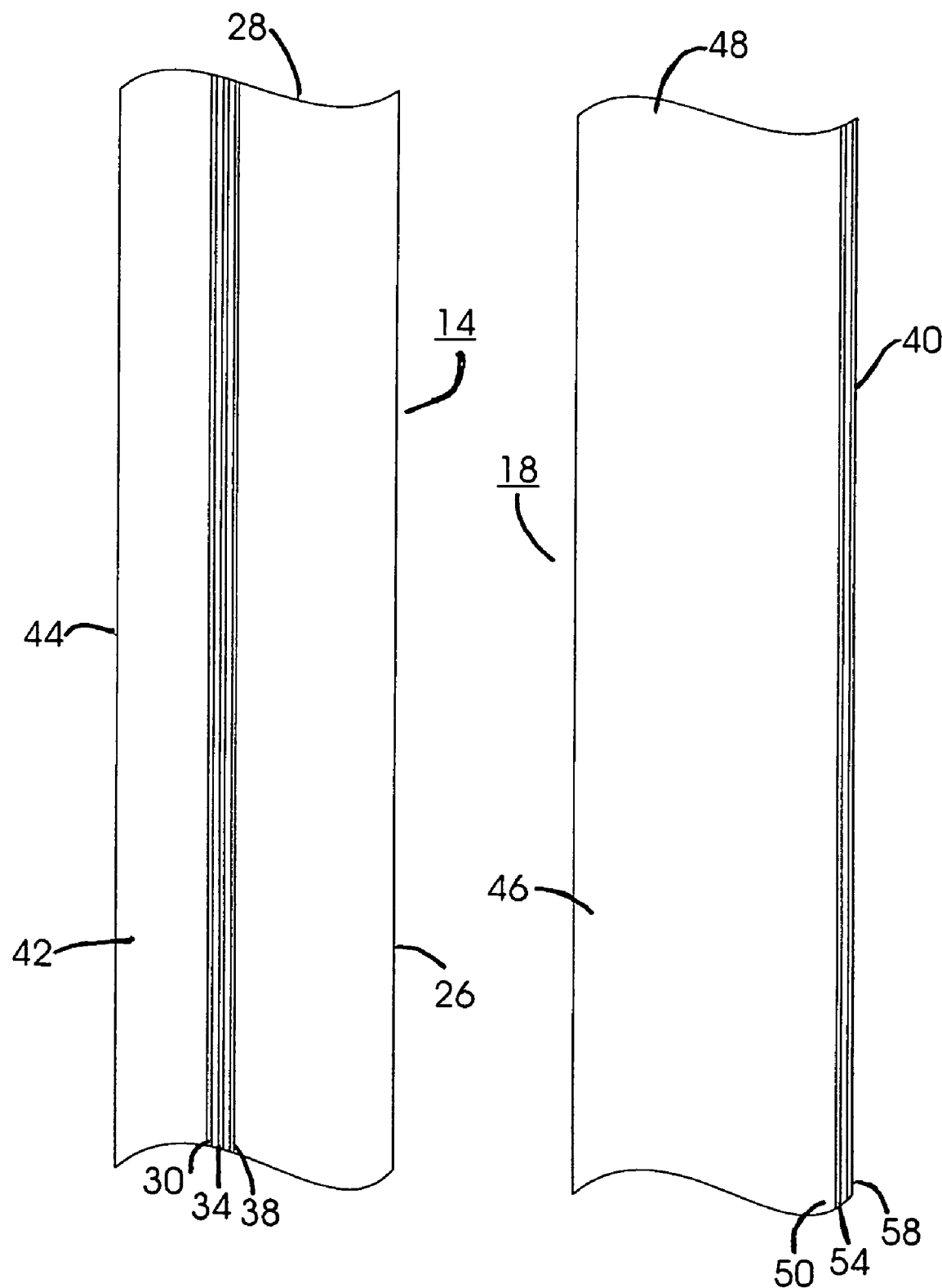
FIG. 2 is a front elevational view of a portion of the first profile and second profile prior to engagement and fusion.
Figure 3:
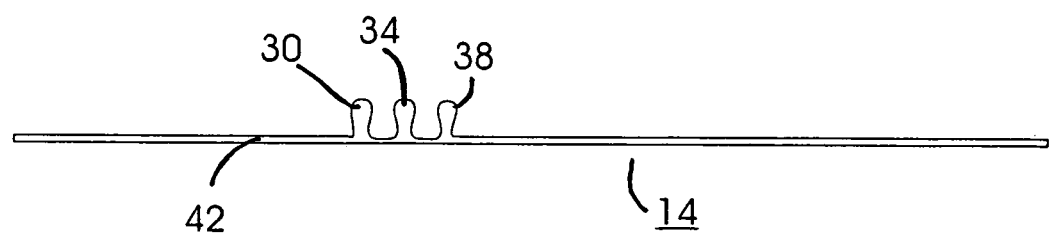
FIG. 3 is a side elevational view of the first profile of FIGS. 1 and 2.

As seen in FIG. 1, the completed profile assembly 10 also includes a compression molded segment seal 22 portion. "Compression molding" is well known. In general, compression molding entails placing a predetermined amount of material between mold halves. The mold halves are closed, causing the enclosed material to become heated, and in turn, causing it to liquefy, filling voids in the molds. Various embellishments to compression molding have been disclosed in various patents. For example, U.S. Pat. No. 4,309,379, which issued Jan. 5, 1982, discloses a "Method and Apparatus for Runnerless Injection-Compression Molding Thermosetting Materials." In this patent, a thermosetting molding material is heated and passed through a heated nozzle into a heated manifold. The heated material is passed from the manifold into a heated mold. The mold is closed to press and cure the material enclosed within it. The cured, finished article is removed from the mold and the process repeated.

In the preferred embodiment of the present invention, the "mold" is a die and anvil. Heat and pressure applied to the seal material causes the seal material to liquefy. When it liquefies, it flows into voids between the two film layers. The sealed areas are gradually cooled, causing the material in the mold to cool and solidify, taking the shape of the mold. In a preferred embodiment of the invention, the cooling time in the mold is increased and the amount of heat is reduced in order to cure the finished product more slowly. In so doing, the segment seal 22 retains its cross section better than it would if the mold were opened quickly or at a relatively higher temperature, and gaps between the film layers which would otherwise allow the passage of air across the seal, are eliminated.

The compression molded segment seal 22 of FIG. 1 comprises the profile adherence surface 42 of the first profile surface 26 fused to the portion of the second profile surface 46, which engages the profile adherence surface 42 and a portion of the first 30, second 34 and third 38 ribs of the first profile surface 14 and the corresponding engaged portion of the first 50, second 54 and third ribs 58 of the second profile surface 46. In the embodiment depicted, the compression molded segment seal 22 portion has a thickness less than the combined thickness of the individual first profile 14 and second profile 18.

Figure 5:
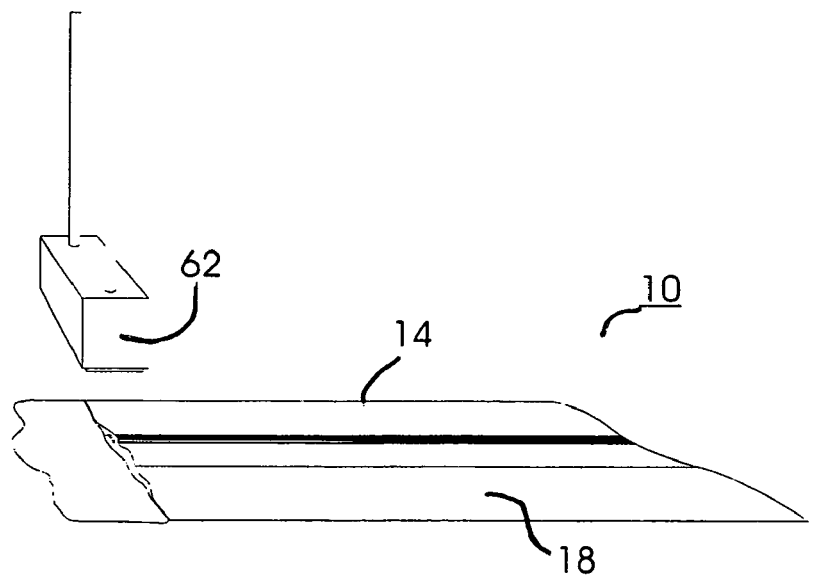
FIG. 5 is a perspective view of the first and second profiles including the sealing apparatus that forms the compression molded segment seal and a single compression molded segment seal.
Figure 6:
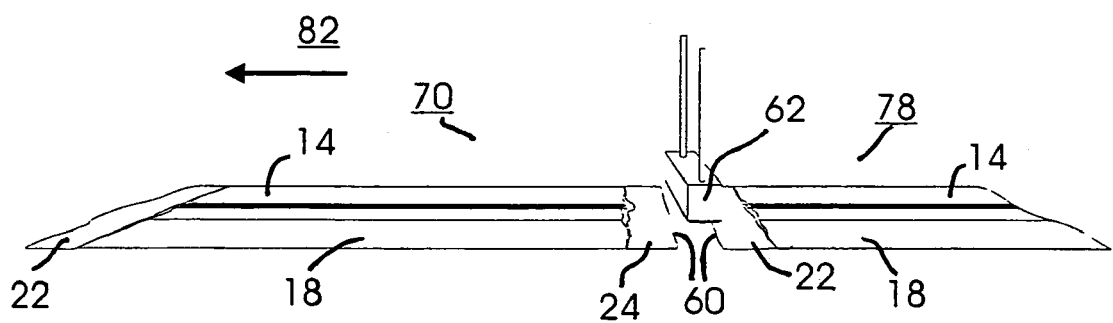
FIG. 6 is a perspective view of the first and second profiles including the compression molded segment seal formed in FIG. 5 and the formation of a second compression molded segment seal.

The formation of the profile assembly 10 and compression molded segment seal 22, as depicted in FIGS. 5 and 6, is accomplished by providing a continuous supply of an interconnected first profile 14 and second profile 18 where the ribs 30, 34, 38 of the first profile 14 are engaged with the ribs 50, 54, 58 of the second profile 18.

As seen in FIG. 5, the engaged first profile 14 and second profile 18 are fed or otherwise positioned in proximity to the compression molded segment sealer 62. The compression molded segment sealer 62 provides heat and pressure to the profile assembly to form the compression molded segment seal 22. In one embodiment of the invention, multiple compression molded segment sealers 62 may be utilized in order to reduce the amount of heat and/or pressure applied at each segment sealer 62.

As seen in FIG. 6, the engaged first profile 14 and second profile 18 are repositioned 82 with the first compression molded segment seal 22 advanced 82 past compression molded segment sealer 62. The second compression molded segment seal 24 is formed, defining the second compression molded segment seal 24 of the completed profile assembly 70 and the first seal 22 of a second incomplete profile assembly 78. While the second compression molded segment seal 24 is being formed, the first profile 14 and second profile 18 are simultaneously cut 60 by the compression molded segment sealer 62 to define the completed profile assembly 70 and form a portion of the first compression molded segment seal 22 for a second incomplete profile 78. The area between the first compression molded segment seal 22 and second compression molded segment seal 24 defines the opening 80 of the reclosable bag profile 70 (as seen in FIG. 8). The second incomplete profile 78 depicted in FIG. 4 is advanced 82 and the process (as depicted in FIGS. 9 and 10) is repeated to form an additional completed profile assembly 70 (as shown in FIGS. 7 and 8).

Figure 7:
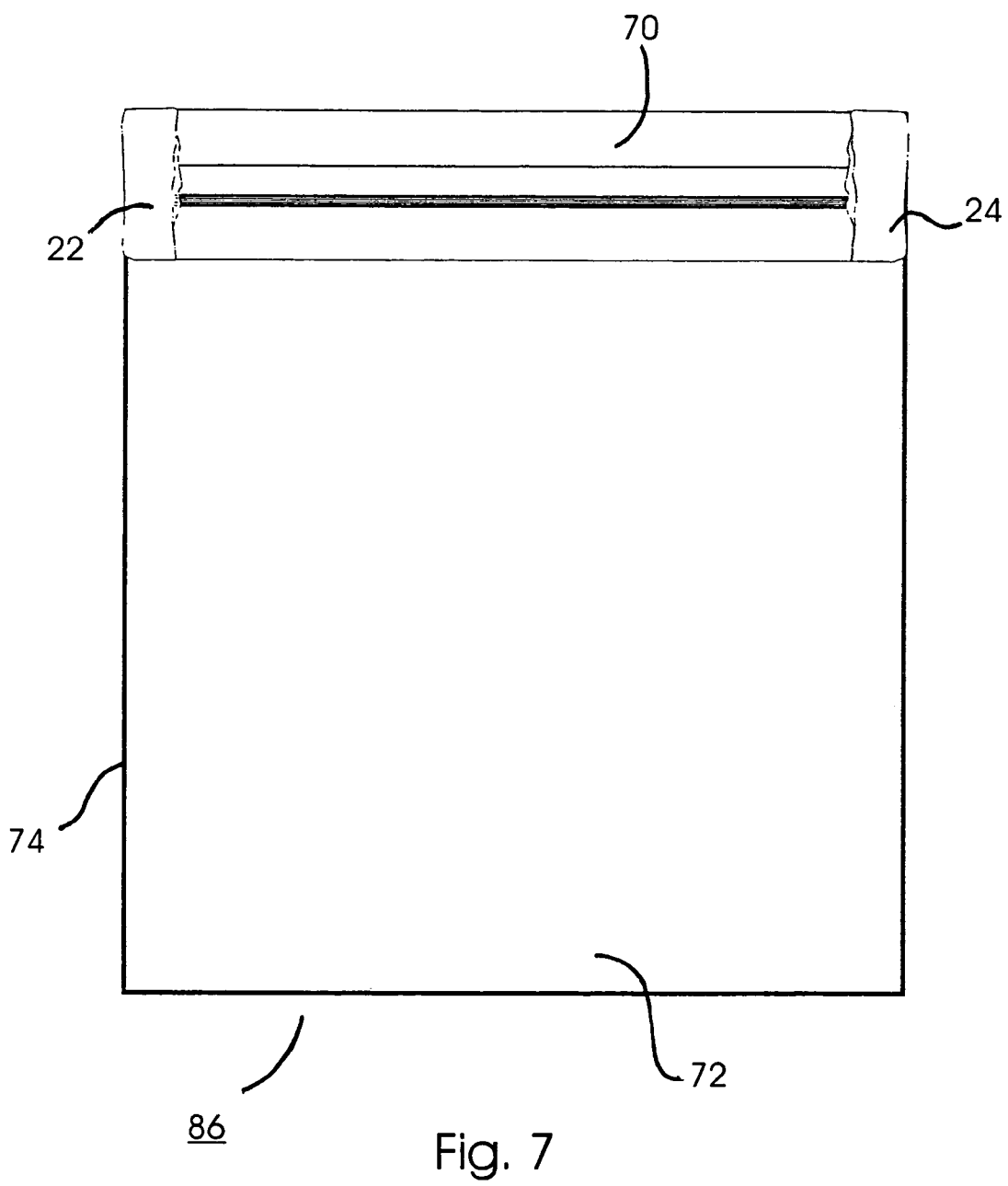
FIG. 7 is a front elevational view of a reclosable bag including the profile seal disclosed in FIGS. 1 through 6.
Figure 8:
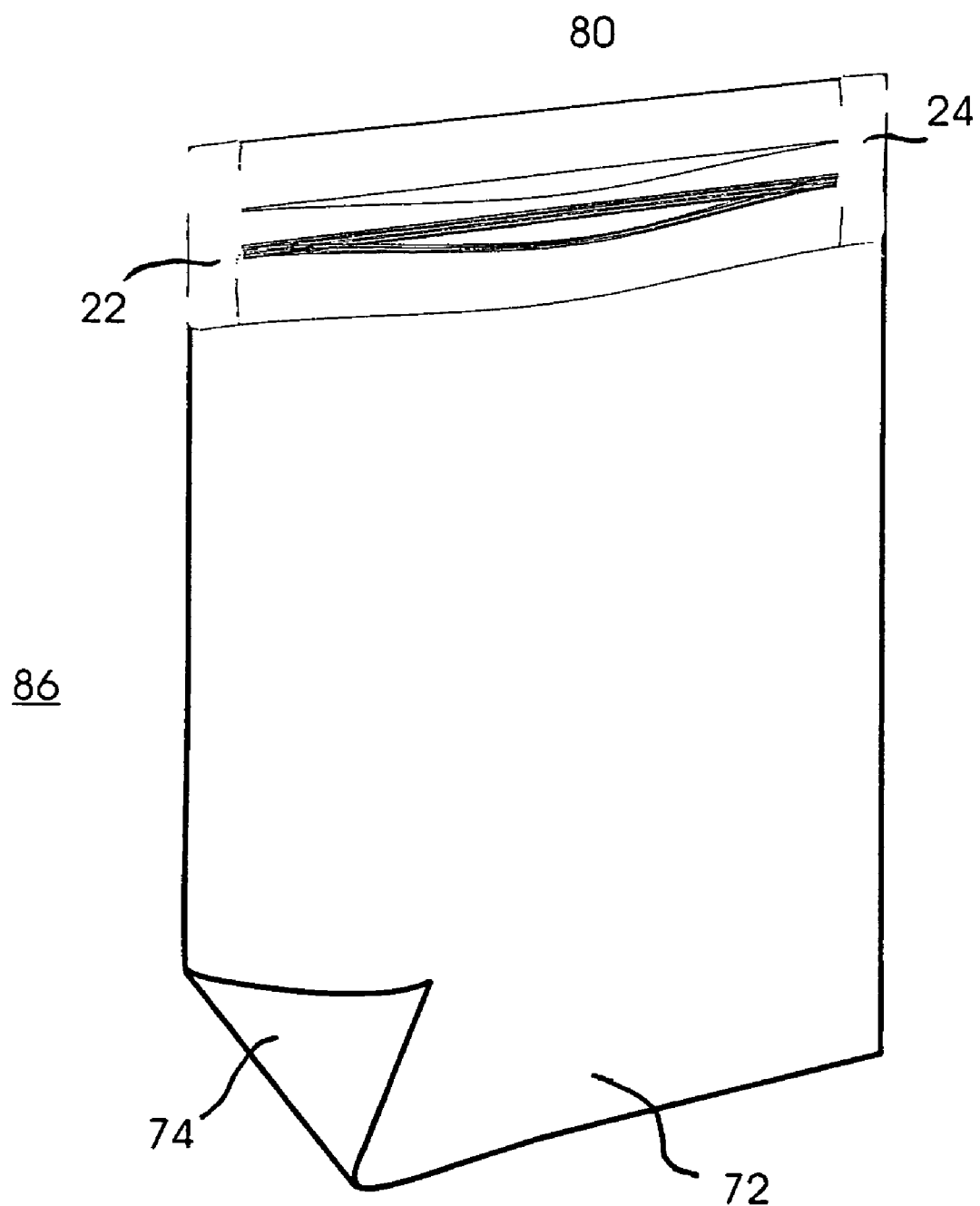
FIG. 8 is a perspective view of a reclosable bag including the profile seal disclosed in FIGS. 1 through 6.

As seen in FIGS. 7 and 8, a reclosable storage bag 84 is created by fusing or otherwise affixing a completed profile assembly 70 to a first bag wall 72 and second bag wall 74. The completed reclosable storage bag 84 includes a first bag wall 72, a second bag wall 74 and the reclosable fastener profile assembly 70 depicted in FIG. 6. As depicted in FIG. 8, the reclosable fastener profile and first 72 and second bag walls 74 combine to define a storage bag 84 with a reclosable opening 80.

Figures 9, 10:
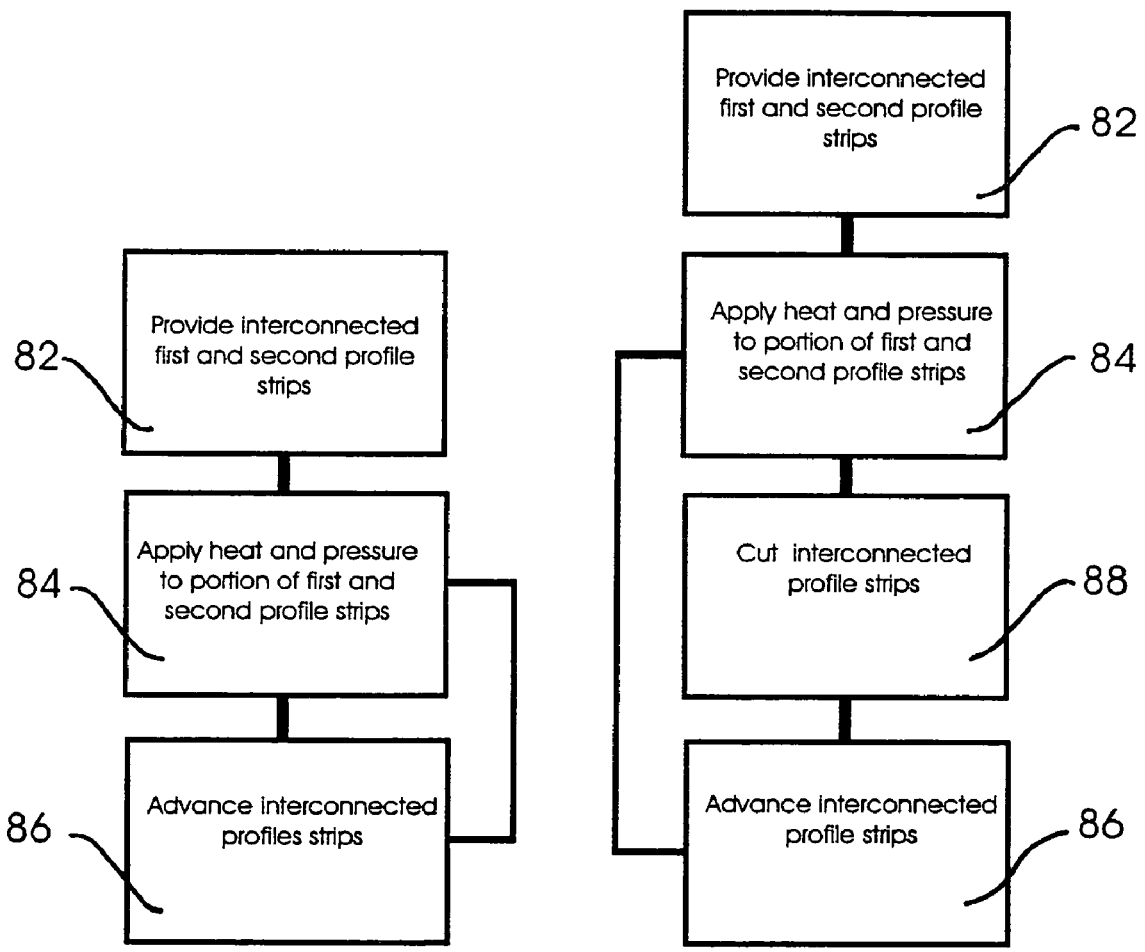
FIG. 9 is a flowchart of the method of forming a reclosable fastener profile assembly disclosed in FIGS. 1 through 6.
FIG. 10 is a flowchart of an alternative method of forming a reclosable fastener profile assembly also disclosed in FIGS. 1 through 6.

FIGS. 9 and 10 represent graphically the method of forming a fastener profile assembly 70 disclosed herein. As seen in FIG. 9, the following steps are performed in sequence: first 82, an interconnected profile strip 10 is provided; second 84, heat and pressure is applied by the compression molded segment sealer 62 to the interconnected profile strip 10 to form a compression molded segment seal 22; and third 86, the profile strip 10 is advanced 82. The second 84 and third 86 steps are then repeated to form additional completed profile assemblies 70.

Alternatively, as seen in FIG. 10, the steps 82, 84, 84 depicted in FIG. 9 are duplicated, however, a cutting step 88 is applied after the interconnected first 14 and second 18 profiles are fused 22 during the second step 84. The cutting step 88 cuts 60 the compression molded segment seal 22, thereby defining a second compression molded segment seal 24. The second step 82, cutting step 88 and third step 86 are then repeated sequentially to form additional individual profile assemblies 70.

In other embodiments (not shown), the reclosable profile assembly 10 may include a peel seal, a frangible seal or other means for detecting tampering. Such means may include any type of known frangible seal which, when broken, is easily detected by the user.

Various features and advantages of the invention are set forth in the following claims.

We claim:

1. A fastener profile assembly strip comprising:
a plurality of individual reclosable profile assembly portions and a permanently sealed portion disposed between and connecting adjacent reclosable portions,
a first profile strip including at least one rib that extends from the surface of said first strip;
a second profile strip opposite said first profile strip; said second strip including at least two ribs that extend from the surface of said second strip; said rib of said first strip and said ribs of said second strip adapted to sealingly engage and maintain an airtight seal when so engaged; and
the sealed portion comprising a compression molded segment seal fusing said first profile strip, said second profile strip and said ribs of said first profile: strip and said second strip; said compression molded segment seal consisting essentially of a fused section of said first and second profile strips formed through the application of relatively lower heat of below 350° F. as compared to conventional heat sealings and pressure and increased mold cooling time wherein the first and second profile strips retain their cross section away from the segment seal without distorting said ribs; the lower heat causing the section to liquify and flow into a void between film layers; said fused section substantially flattened to form an airtight seal of said first and second profile strips, at the opposed distal ends of said profile assembly strip and wherein said first profile strip includes a first distal end and a distal second end, said second profile strip includes a first distal end and second distal end, and wherein said respective first distal ends and respective second distal ends of said first and second profile strips are sealed together through application of said compression molded segment seal to form said fused section, the ribs adjacent the molded segment seal retaining their cross-section, thereby maintaining said airtight seal of said first and second profile strips when interlocked.

2. The fastener profile assembly strip of claim 1, wherein said compression molded segment seal includes a severing portion of said first profile strip and said second profile strip for cutting said fastener profile and creating an individual profile fastener assembly.

3. The fastener profile assembly strip of claim 1, wherein said continuous supply of first profile strips, said continuous supply of second profile strips and a plurality of said compression molded segment seal create a continuous linear supply of profile fastener assemblies.

4. The fastener profile assembly of claim 1, wherein said first profile strip and said second profile strip are configured to fittingly mate together such that said first profile strip is flush with said second profile strip when said first profile strip and said second profile are engaged.

5. The fastener profile assembly strip of claim 1, wherein said ribs of first and second strips have respective head portions and neck portions, wherein said head portions are arcuate in profile.

6. The fastener profile assembly of claim 1, wherein said ribs of said first and second strips have respective head portions and neck portions, and wherein said head portions are wider than said neck portions.

7. The fastener profile assembly of claim 1, wherein said second strip includes one more rib than said first strip.

8. A reclosable storage bag comprising:
a first bag wall;
a second bag wall; and
a reclosable fastener profile assembly, said assembly comprising:
a first profile strip including at least one rib that extends from the surface of said first strip;
a second profile strip opposite said first strip said strip including at least two ribs that extend from the surface of said second strip; said rib of said first strip and said ribs of said second strip adapted to sealingly engage and maintain an airtight seal when so engaged; and
a compression molded segment seal portion fusing said first profile strip, said second profile strip and said ribs of said first profile strip and said second profile strip; said compression molded segment seal consisting essentially of a fused section of said first and second profile strips formed through the application of relatively lower heat of below 350° F. as compared to conventional heat sealings and pressure and increased mold cooling time wherein the first and second profile strips retain their cross section away from the segment seal without distorting said ribs; the lower heat causing the section to liquify and flow into a void between film layers; said fused section substantially flattened to form an airtight seal of said first and second profile strips, at the opposed distal ends of said profile assembly strip and wherein said first profile strip includes a first distal end and a second distal end, said second profile strip includes a first distal end and second distal end, and wherein said respective first distal ends and respective second distal ends of said first and second profile strips are sealed together through application of said compression molded segment seal to form said fused section, the ribs adjacent the molded segment seal retaining their cross-section, thereby maintaining said airtight seal of said first and second profile strips when interlocked; wherein said first profile strip and said second profile strip are heat sealed to said first bag wall and said second bag wall, respectively.

* * * * *